United States Patent [19]
Green

[11] 3,735,998
[45] May 29, 1973

[54] TRAILER FRAME CONSTRUCTION
[76] Inventor: Leon K. Green, 568 West 2nd St., South, Salt Lake City, Utah 84101
[22] Filed: Mar. 5, 1971
[21] Appl. No.: 121,363

[52] U.S. Cl..............................280/106 T, 296/28 M
[51] Int. Cl. .................................................B62f 21/02
[58] Field of Search........................280/106 R, 106 T

[56] References Cited
UNITED STATES PATENTS 1,846,464   2/1932   Andren...........................280/106 R
  875,254  12/1907   Gartshore.......................280/106 R

*Primary Examiner*—Philip Goodman
*Attorney*—Clarence A. O'Brien and Harvey B. Jacobson

[57] ABSTRACT

A vehicle frame construction including opposite side longitudinal members interconnected by means of longitudinally spaced and transversely extending cross-beams secured therebetween. The side beams or members each include upstanding or outside flanges having inwardly projecting generally horizontal lower flange portions and upstanding upper flange portions supported along the upper edge portions from the upper marginal portions of the outside flanges and including lower marginal edges spaced inwardly of the corresponding outside flanges and spaced above the corresponding lower flange portions. The cross-beams extend between and have their ends abutted against the opposing surfaces of the outside flanges and secured thereto by welding. The lower marginal edges of the upper flanges abut and are welded to the adjacent upper surface portions of the opposite ends of the cross-beams and the inner edge portions of the lower flange portions abut and are secured to the undersurfaces of the opposite ends of the cross-beams with the remote marginal portions of the lower flanges spaced below the adjacent undersurfaces of the cross-beams whereby strength at the junctures of the opposite ends of the cross-beams and longitudinal members is afforded without extreme rigidity thus providing a frame which is strong and yet capable of flexure under extreme and shock loads without failure.

6 Claims, 7 Drawing Figures

Patented May 29, 1973

Leon K. Green
INVENTOR.

BY Clarence A. O'Brien
and Harvey B. Jacobson
Attorneys

Leon K. Green
INVENTOR.

TRAILER FRAME CONSTRUCTION

The frame construction of the instant invention is illustrated and described hereinafter as a boat trailer frame and in particular a boat trailer frame adapted to support the more popular V or deep V boat hulls. However, the frame construction may also be utilized to advantage in the construction of other types of vehicles.

Present day boat trailer frame construction utilizes, for the most part, either box-type or inverted channel members for the longitudinal members of the frames and inverted channel members for the cross-members of the frames with the ends of the cross-members abutted against and welded to the adjacent vertical flange portions of the longitudinal members. While this construction affords a trailer frame which is servicable in most respects, such frames tend to be rigid in excess of the rigidity desired if the frames are heavily constructed to carry reasonably large loads. The excess rigidity of these frames tends to place excessive loads on the welded joints thereof when heavy loads are carried and rough roads are encountered. Accordingly, it is the main object of this invention to provide a trailer frame construction capable of handling heavy loads but which is flexible to a degree enabling excessive road shocks to be more readily dampened and thus not directly and fully transmitted to the boat hull supported from the frame.

Yet another object of this invention is to provide a boat trailer frame construction including opposite side longitudinal members and cross-beam members secured therebetween with the opposite ends of the cross-beam members enjoying welded joints with the longitudinal members at points spaced along the opposite ends of the cross-beam members both along the upper surfaces of the cross-beam members as well as the undersurfaces of the cross-beam members.

Another important object of this invention is to provide a trailer frame construction including cross-beam members having downwardly depressed central portions in order to adapt the frame to support deep V-hulls while maintaining the elevation of the boat supported from the frame as low as possible relative to the side rails of the frame from which the running gear is supported.

A final object of this invention to be specifically enumerated herein is to provide a boat trailer frame construction in accordance with the preceding objects which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

Figure 1:
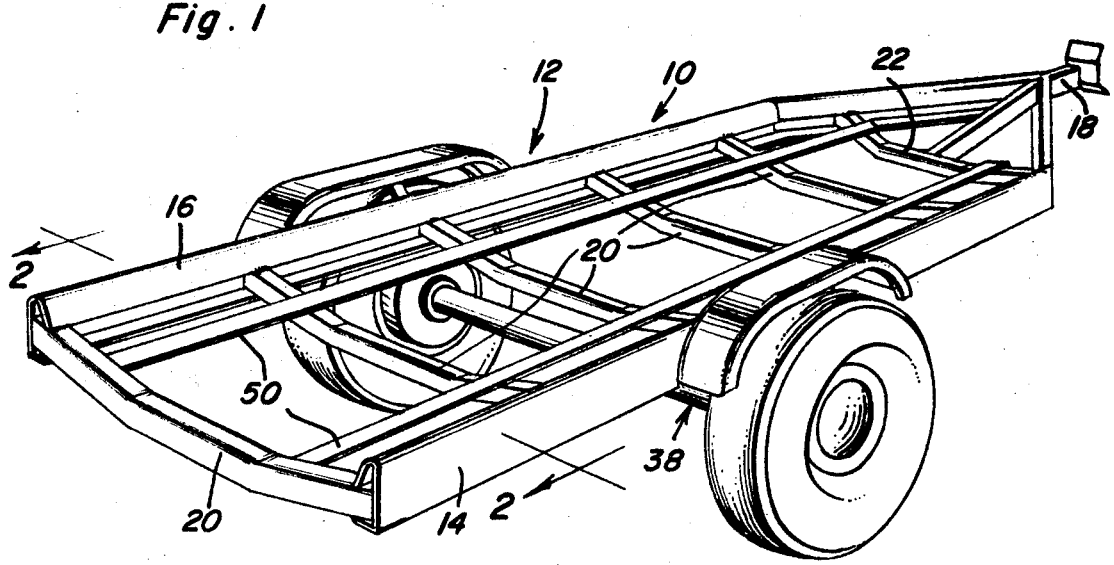
FIG. 1 is a perspective view of a boat trailer frame constructed in accordance with the present invention.
Figure 3:
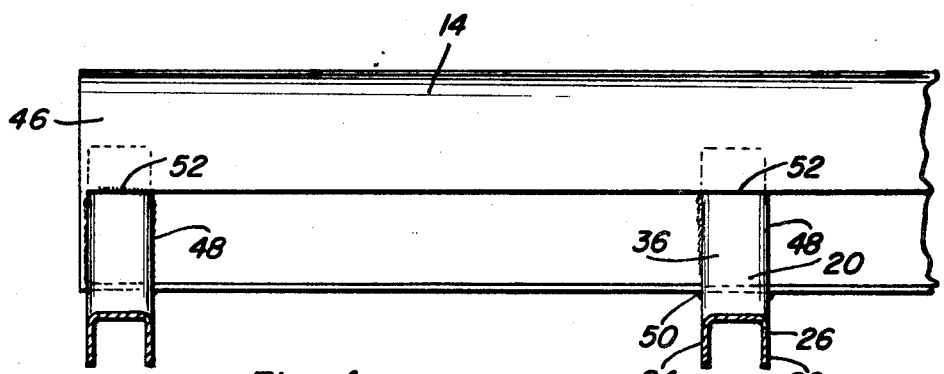
FIG. 3 is an enlarged fragmentary longitudinal vertical sectional view taken substantially upon the plane indicated by the section line 3—3 of FIG. 2.
Figure 4:
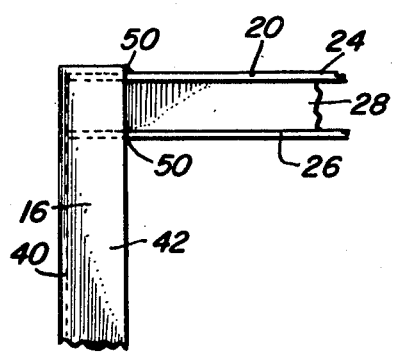
FIG. 4 is a bottom plan view of one of the corner portions of the trailer frame illustrated in FIG. 1.

Referring now more specifically to the drawings, the numeral 10 generally designates a boat trailer constructed in accordance with the present invention.

The trailer 10 includes a frame referred to in general by the reference numeral 12 and the frame may be seen to include opposite side right and left hand longitudinal members 14 and 16 whose forward ends are angulated so as to be forwardly convergent. The forward convergent ends of the longitudinal members 14 and 16 are secured to opposite sides of a center towing tongue 18.

The frame 12 includes longitudinally spaced transversely extending transverse frame members 20 and 22 extending between and secured to the longitudinal members 14 and 16. The members 20 may be of substantially the same length but the forward transverse member 22 is secured between the forwardly convergent front ends of the longitudinal members 14 and 16 and is therefore shorter than the transverse members 20. In addition, the rear end of the tongue 18 abuts against and is secured to the front side of the central portion of the transverse member 22 in any convenient manner such as by welding.

Figure 5:
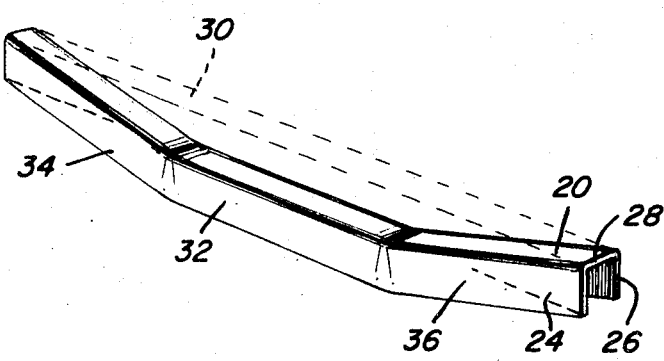
FIG. 5 is a perspective view of one of the cross-frame members of the trailer frame illustrating the manner in which a substantially straight inverted channel member is utilized and formed in a hydraulic press to provide a downwardly depressed central area thereof.

With attention now invited more specifically to FIG. 5 of the drawings, it may be seen that each of the transverse members 20 comprises an inverted channel shaped member including upstanding flanges 24 and 26 interconnected at their upper edge portions by means of an integral bight portion 28 extending therebetween. The transverse member 20 is initially formed so as to be straight as indicated by the phantom lines 30 and thereafter is placed in a hydraulic press so as to downwardly depress the central portion 32 thereof with the opposite end sections 34 and 36 of each transverse member 20 being upwardly divergent.

Of course, the transverse member 22 is formed in substantially the same manner and by securing the transverse members 20 and 22 between the longitudinal members 14 and 16 an upwardly opening cradle is formed in which the undersurface portions of a deep V-hull may be supported with the hull at a lower elevation relative to the longitudinal members 14 and 16 from which the wheeled axle assembly 38 is supported in any convenient manner (not shown).

Figure 2:
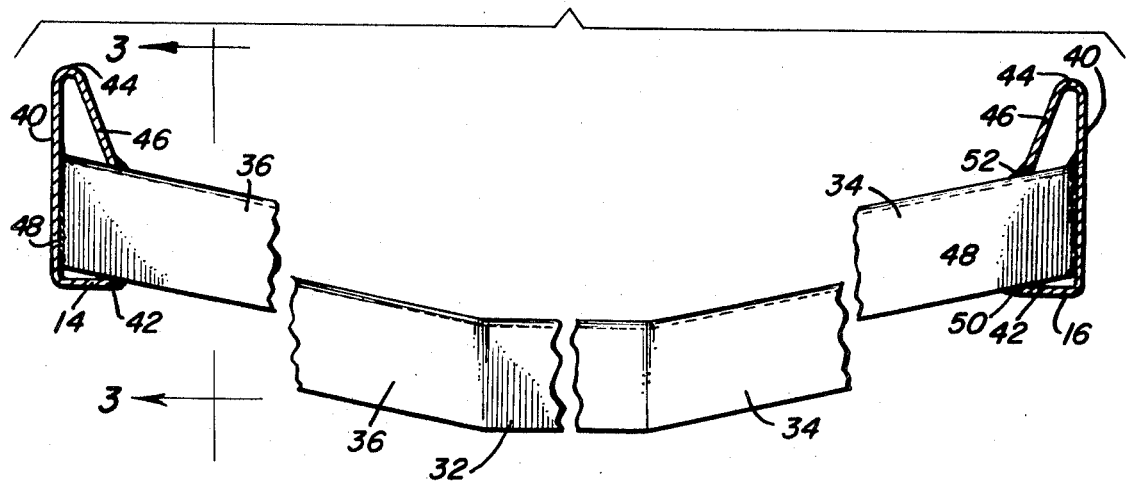
FIG. 2 is a fragmentary enlarged transverse vertical sectional view taken substantially upon the plane indicated by the section line 2—2 of FIG. 1.

With attention now invited more specifically to FIG. 2 of the drawings, it may be seen that each of the longitudinal members 14 and 16 includes an upstanding outside flange 40 terminating at its lower marginal edge portion in a substantially horizontal inwardly directed lower flange 42. In adition, the upper marginal edge portions of the outside flanges 40 are curved smoothly inwardly and downwardly as at 44 to form inwardly and downwardly inclined upper flanges 46 whose lower marginal edge portions terminate downwardly at points spaced above the corresponding lower flanges 42. The inclined and upwardly divergent end sections 34 and 36 of the transverse members 20 and 22 are endwise abutted against the opposing inner surfaces of the outer flanges 40 and secured thereto as by welding 48 with the welding 48 extending along the entire end edges of the end sections 34 and 36. In addition, the inner marginal edge portions of the lower flanges 42 abut against and are welded to the lower marginal edges of the flanges 24 and 26 as at 50 and the lower marginal edges of the upper flanges 46 are abutted against and secured to the bight portions 28 as at 52. In this manner, triangular bracing both above and below each transverse member end is provided and longitudinally spaced points of the upper and lower surfaces as well as the end faces of the transverse members 20 are secured to the longitudinal members 14 and 16.

Figure 6:
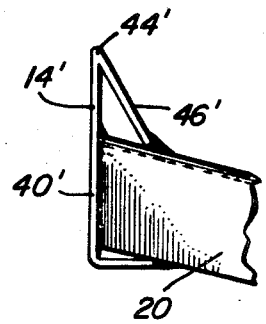
FIG. 6 is a fragmentary end elevational view of the left hand side of a boat trailer constructed in accordance with the present invention and utilizing a side rail member of slightly modified cross-sectional shape.

With attention now invited more specifically to FIG. 6 of the drawings, there will be seen a modified form of longitudinal member 14' which is very similar to the longitudinal member 14 except that the outer flange 40' thereof is bent sharply inwardly and downwardly as at 44' to define the inclined inner flange 46' corresponding to the inner flange 46. Otherwise, the longitudinal member 14' is substantially identical to the longitudinal member 14.

Figure 7:
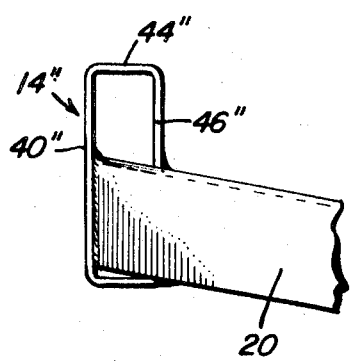
FIG. 7 is a rear elevational view similar to FIG. 6 but illustrating a second modified form of side frame member.

With attention now invited more specifically to FIG. 7 of the drawings, there may be seen a longitudinal member referred to in general by the reference numeral 14'' and which is similar to the longitudinal members 14 and 14'. However, the upper marginal edge portion of the outer flange 40'' of the longitudinal member 14'' terminates in a horizontally inwardly directed flange 44'' which in turn terminates inwardly in a downturned vertical upper flange 46'' corresponding to the flanges 46 and 46'. Of course, the longitudinal member 14'' is identical in all other respects to the longitudinal members 14 and 14' and therefore has the opposite ends of the corresponding transverse members 20 and 22 secured thereto in the same manner.

If it is desired, the central portions of the upwardly divergent end sections 34 and 36 of the transverse members 20 may be interconnected by means of opposite side longitudinal stringers 56 extending thereover and secured thereto by welding. Also, any suitable boat hull supporting structure may be utilized on the trailer 10.

By bending the transverse members 20 instead of prefabricating the same out of precut flange portions corresponding to the flanges 24 and 26 in the bight portion 28, a stronger beam is provided and at a lower cost of manufacture. Also, the longitudinal members 14 and 16 may be readily formed from suitable stock in the dimensions desired and by utilizing the desired thickness material to provide the load capacity desired. Thus, the trailer 10 is constructed so as to afford greater strength due to the novel manner in which the opposite ends of the transverse members 20 and 22 are secured to the longitudinal members 14 and 16 and yet flexing of the frame 12 is afforded for absorbing load shocks and other stresses without failure and transmitting road shocks directly to a boat supported from the trailer 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A frame construction including opposite side longitudinal members interconnected by means of longitudinally spaced and transversely extending cross-beams secured therebetween, said side longitudinal members each including an upstanding outside web having an inwardly projecting generally horizontal lower flange and an upstanding upper flange including an upper edge portion extending along and supported from the upper marginal portion of the corresponding outside web and a lower marginal edge spaced inwardly of the corresponding outside web and spaced above the corresponding lower flange, the opposite end portions of the cross-beams being upwardly inclined and abutted against and welded to the inner opposing surfaces of the outside webs and the free marginal edge portions of the upper and lower flange portions being abutting against and welded to the upper and lower surfaces of the opposite portions of the cross-beams at points spaced from the terminal ends of the cross-beams.

2. The combination of claim 1 wherein said cross-beams comprise inverted channel members.

3. The combination of claim 1 wherein said upper and lower flanges of said longitudinal members are formed integrally with said outside webs.

4. The combination of claim 3 wherein the upper marginal edge portions of said outside webs are smoothly bent inwardly and downwardly and merge smoothly into said upper flanges, the latter being generally planar and downwardly convergent relative to each other and downwardly divergent relative to the corresponding outside webs.

5. The combination of claim 3 wherein the upper marginal edge portions of said outside webs are bent sharply downwardly and inwardly to form said upper flange portions, said upper flange portions being downwardly and inwardly inclined and divergent from the corresponding outside webs.

6. A frame construction including opposite side longitudinal members interconnected by means of longitudinally spaced and transversely extending cross-beams secured therebetweeen, said side longitudinal members each including an upstanding outside web having an inwardly projecting generally horizontal lower flange and an upstanding upper flange including an upper edge portion extending along and supported from the upper marginal portion of the corresponding outside web and a lower marginal edge spaced inwardly of the corresponding outside web and spaced above the corresponding lower flange, the opposite ends of the cross-beams being abutted against and secured to the inner opposing surfaces of the outside webs and the free marginal edge portions of the upper and lower flange portions being abutting against and secured to the upper and lower surfaces of the opposite ends of the cross-beams at points spaced from the terminal ends of the cross-beams, said upper and lower flanges of said longitudinal members being formed integrally with said outside webs, the upper marginal edge portions of said outside webs terminating in generally horizontally inwardly directed flanges which are in turn bent downwardly at their inner edge portions to define said upstanding upper flange portions, said upper flange portions being substantially vertically disposed with their lower ends spaced vertically above and in vertical alignment with the inner marginal edge portions of the corresponding lower flanges.

* * * * *